(12) United States Patent
Griseri et al.

(10) Patent No.: US 9,300,110 B2
(45) Date of Patent: Mar. 29, 2016

(54) MULTI-WAVELENGTH DISTRIBUTED RAMAN AMPLIFICATION SET-UP

(71) Applicant: Cisco Technology, Inc., San Jose, CA (US)

(72) Inventors: Enrico Griseri, Milan (IT); Enrico Self, Lombardy (IT); Mauro Brunella, Brugherio (IT)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 14/037,794

(22) Filed: Sep. 26, 2013

(65) Prior Publication Data

US 2015/0085350 A1    Mar. 26, 2015

(51) Int. Cl.
*H04B 10/29* (2013.01)
*H01S 3/30* (2006.01)
*H04B 10/291* (2013.01)
*H04B 10/293* (2013.01)
*H01S 3/067* (2006.01)
(Continued)

(52) U.S. Cl.
CPC ............ *H01S 3/302* (2013.01); *H04B 10/2916* (2013.01); *H04B 10/2933* (2013.01); *H01S 3/06754* (2013.01); *H01S 3/094003* (2013.01); *H01S 3/094096* (2013.01); *H01S 3/10069* (2013.01); *H01S 2301/02* (2013.01)

(58) Field of Classification Search
CPC ... H01S 3/00; H01S 2301/04; H01S 3/10007; H01S 3/10015; H01S 3/10069; H01S 3/302; H01S 2301/02; H04B 10/2916; H04B 10/2933

USPC ............................................. 359/341.41, 334
See application file for complete search history.

(56) References Cited

U.S. PATENT DOCUMENTS 5,903,385 A    5/1999  Sugaya et al.
6,091,539 A    7/2000  Kosaka
(Continued)

FOREIGN PATENT DOCUMENTS

EP    1182808 A2    2/2002
EP    1675283 A1    6/2006

OTHER PUBLICATIONS

Kim, et al., "In Situ Design Method for Multichannel Gain of a Distributed Raman Amplifier with Multiwave OTDR," IEEE Photonics Technology Letters, vol. 14, No. 12, Dec. 2002, pp. 1683-1685.

(Continued)

*Primary Examiner* — Eric Bolda
(74) *Attorney, Agent, or Firm* — Edell, Shapiro & Finnan, LLC

(57) ABSTRACT

Techniques are presented herein to set power levels for multiple Raman pump wavelengths in a distributed Raman amplification configuration. A first receive power measurement is obtained at a second node with a controlled optical source at a first node turned on and with a plurality of Raman pump lasers at different wavelengths at the second node turned off. A second receive power measurement is obtained at the second node with the controlled optical source at the first node turned on and the plurality of Raman pump lasers turned on to respective reference power levels to inject optical Raman pump power at a corresponding plurality of wavelengths into the optical fiber span. Based on a target Raman gain and a target Raman gain tilt, respective ratios of a total power are obtained, each ratio to be used for a corresponding one of the plurality of Raman pump lasers.

20 Claims, 4 Drawing Sheets

(51) Int. Cl.
  *H01S 3/094* (2006.01)
  *H01S 3/10* (2006.01)

(56) References Cited

U.S. PATENT DOCUMENTS

| | | | |
|---|---|---|---|
| 6,233,091 B1 | 5/2001 | Kosaka et al. | |
| 6,388,801 B1 | 5/2002 | Sugaya et al. | |
| 6,930,823 B2 | 8/2005 | Nakamoto et al. | |
| 6,961,522 B1 | 11/2005 | Castagnetti et al. | |
| 7,174,097 B2 | 2/2007 | Alleston et al. | |
| 8,477,411 B2 | 7/2013 | Griseri et al. | |
| 2002/0163635 A1 | 11/2002 | Reepschlager et al. | |
| 2003/0053193 A1* | 3/2003 | Minakawa | H01S 3/0014 359/333 |
| 2004/0042068 A1 | 3/2004 | Eiselt | |
| 2004/0052453 A1 | 3/2004 | Mao et al. | |
| 2011/0013267 A1* | 1/2011 | Griseri et al. | 359/334 |
| 2011/0141552 A1* | 6/2011 | Ghera et al. | 359/334 |

OTHER PUBLICATIONS

Kim, et al., "Semi-Analytic Gain Control Algorithm for the Fiber Raman Amplifier under Dynamic Channel Reconfiguration," Optical Fiber Communication Conference, Optical Society of America, Mar. 2005, 3 pages.

Zhang, et al., "Matrix Algorithms for Dynamic Gain-Spectrum Adjustment of Backward-Pumped Distributed Fiber Raman Amplifier," Journal of Lightwave Technology, vol. 24, No. 3, Mar. 2006, pp. 1581-1588.

International Search Report and Written Opinion in counterpart International Application No. PCT/US2014/055549, mailed Mar. 4, 2015, 11 pages.

* cited by examiner

MULTI-WAVELENGTH DISTRIBUTED RAMAN AMPLIFICATION SET-UP

TECHNICAL FIELD

The present disclosure relates to Raman amplification for optical fiber communication.

BACKGROUND

Distributed Raman amplification is a technique useful to achieve amplification gain in an optical fiber by injecting strong light power, called a "pump", at a proper wavelength. It is common to employ multi-wavelength light pump sources in order to achieve broad spectrum light amplification suitable for dense wavelength division multiplexed (DWDM) applications. The light pump source needs to be set to a proper power level and unbalance, whether for a light pump at a single wavelength or at each of multiple wavelengths in order to achieve a desired gain level, gain flatness and gain tilt.

DESCRIPTION OF EXAMPLE EMBODIMENTS

Overview

Techniques are presented herein to set power levels for multiple Raman pump wavelengths in a distributed Raman amplification configuration. For an optical fiber span coupled between a first node and a second node, a first receive power measurement is obtained at the second node with a controlled optical source at the first node turned on and with a plurality of Raman pump lasers at different wavelengths at the second node turned off. A second receive power measurement is obtained at the second node with the controlled optical source at the first node turned on and the plurality of Raman pump lasers turned on to respective reference power levels to inject optical Raman pump power at a corresponding plurality of wavelengths into the optical fiber span. A reference Raman gain is computed based on the first receive power measurement and the second receive power measurement. A total power from the plurality of Raman pump lasers needed to achieve a target Raman gain in the optical fiber span is computed based on the reference Raman gain, target Raman gain and a sum of the respective reference power levels used by the plurality of Raman pump lasers to obtain the second receive power measurement. Based on the target Raman gain and a target Raman gain tilt, respective ratios of the total power are obtained, each ratio to be used for a corresponding one of the plurality of Raman pump lasers. The power of each of the plurality of Raman pump lasers is set according to its respective ratio of the total power.

Example Embodiments

In an optical network that uses Distributed Raman Amplification (DRA) techniques, an optical gain in deployed fibers is achieved by injecting a strong light power at a proper wavelength using Raman pump lasers. Multi-wavelength light sources are used to achieve broad spectrum Raman amplification suitable for Dense Wavelength Division Multiplexed (DWDM) applications.

Techniques are presented herein to determine the proper power level of the Raman pump lasers in order to achieve a desired gain level and gain tilt in an optical fiber span. These techniques do not require previous knowledge of the type and characteristics of the fiber span to be amplified.

Figure 1:
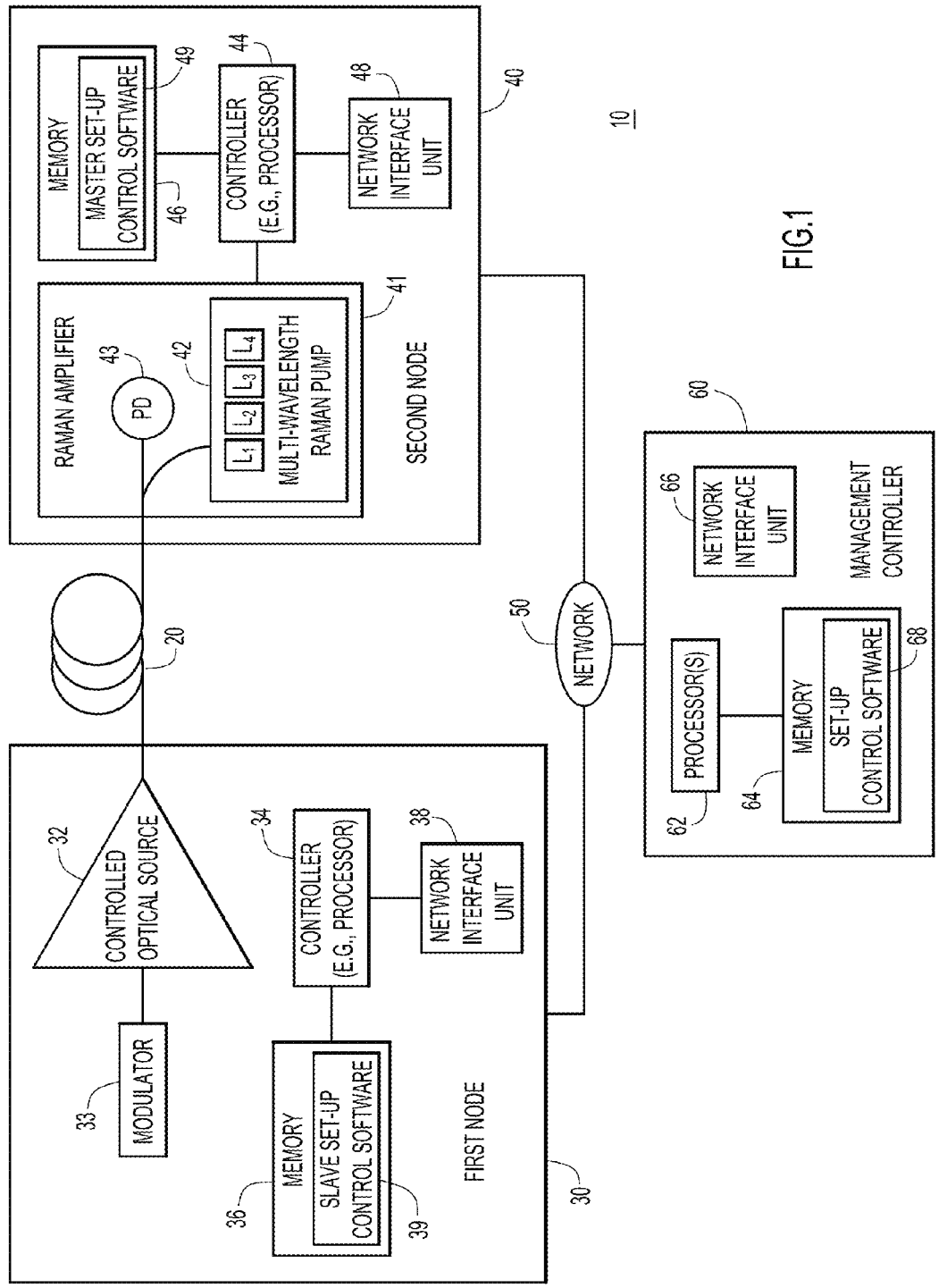
FIG. 1 is a block diagram showing an optical fiber span and a Raman amplifier at one end of the span that is configured to perform the multi-wavelength distributed Raman amplification set-up techniques presented herein.

Reference is now made to FIG. 1. FIG. 1 shows a system 10 in connection with a span of an optical fiber 20 that extends between a first node 30 and a second node 40. In the example shown in FIG. 1, the first node is said to be at the input or transmit end of the fiber 20 and the second node 40 is said to be at the output or receive end. Optical signals are transmitted from the first node 30 to the second node 40 through the fiber 20.

At the first node 30, there is a controlled optical source 32, a modulator 33, a controller 34, memory 36 and a network interface unit 38. The controlled optical source 32 may be a single wavelength controlled optical source, a Dense Wavelength Division Multiplexed (DWDM) controlled optical source that outputs a channel comb of a plurality of optical wavelengths, or a wideband optical source that outputs an optical signal in the wavelength range where amplification is required. An Erbium Doped Fiber Amplifier (EDFA) is useful to generate a wideband optical signal, and may be used as the controlled optical source 32. The modulator 33 is an optical modulator that modulates an optical signal with the data to be transmitted from the first node 30 through the fiber 20 to the second node 40. For the sake of generality, modulator 33 can be located before or after a chain of similar nodes preceding node 40.

The controller 34 may be a microprocessor or microcontroller. In one example, the controller 34 is a microprocessor that executes software instructions stored in memory 36. For example, the memory 36 stores slave set-up control software 39. The network interface 38 enables network communications with the second node 40, or with a controller entity described hereinafter, via network 50, e.g., an Internet Protocol (IP) or other Layer 3 network.

The second node 40 comprises a Raman amplifier 41 that includes a multi-wavelength Raman pump 42 and a photodiode 43. The multi-wavelength Raman pump 42 includes a plurality of Raman pump lasers, for example, four lasers denoted $L_1$, $L_2$, $L_3$ and $L_4$. It should be understood that the Raman pump 42 may have fewer or more than four pump lasers, and that four is only an example. The multi-wavelength Raman pump 42 injects optical Raman pump power into the fiber 20 at a plurality of wavelengths according to the number of Raman pump lasers provided. The single photodiode (PD) 43 is used to measure the optical signal power from the first node 30 at the second node 40 through a tap coupler (not shown in FIG. 1 for simplicity). The photodiode 43 may be a wideband photodiode and can measure a level of the optical signal across a wide range of wavelengths.

The second node 40 also includes a controller 44, memory 46 and network interface unit 48. The controller 44 is, for example, a microprocessor or microcontroller, and executes software stored in memory 46. For example, memory 46 stores master set-up control software 49 that the controller 44 executes to control the set-up procedure described herein. The network interface unit 48 enables network communications on behalf of the second node 40. There is also a demodulator in the second node 40, but for simplicity the demodulator is not shown in FIG. 1.

The first node 30 and second node 40 may engage in control plane communications with each over network 50. Again, network 50 may be an IP-based network, and is meant to include local area networks and wide area networks.

It is to be understood that an actual deployed optical network has numerous nodes connected to each other by optical fibers. There are numerous optical fiber spans that may use distributed Raman amplification and thus may employ the techniques presented herein. In addition, the first and second nodes shown in FIG. 1 may include additional components, but for simplicity those components are not shown as they do not relate to or participate in the Raman amplification set-up techniques presented herein.

A management controller 60 is provided that performs management functions in the optical network. The management controller 60 communicates with all nodes in the optical network by way of network 50. The management controller 60 may be a computing apparatus, e.g., server blade or cloud application running in a data center. FIG. 1 shows that the management controller 60 includes a processor (or multiple processors) 62, memory 64 and a network interface unit 66. The network interface unit 66 enables network communications over network 50 with the first node 30 and second node 40. The processor 62 executes set-up control software 68 stored in memory 64 to perform one or more of the operations described hereinafter that are part of the Raman set-up procedure.

The memory 36 in first node 30, memory 46 in second node 40 and memory 64 in management controller 60 may comprise read only memory (ROM), random access memory (RAM), magnetic disk storage media devices, optical storage media devices, flash memory devices, electrical, optical, or other physical/tangible memory storage devices. In general, these memories may comprise one or more tangible (non-transitory) computer readable storage media (e.g., a memory device) encoded with software comprising computer executable instructions and when the software instructions are executed by a processor (e.g., by the controller 34, controller 44 and processor 64, respectively) the processor is operable to perform the operations described herein. That is, the controller 44 of the second node is operable to obtain first and second receive power measurements, and a noise measurement, as described hereinafter, and the controller 44 or the processor 62 in the management controller 60 is operable to perform the computations described hereinafter to generate the power ratios used for the Raman pump lasers at the second node 40.

The Raman set-up procedure presented herein may be invoked automatically by the set-up control software 68 in the management controller 60 or by the master set-up control software 49 in the second node 40. The invocation of the Raman set-up procedure will be described in further detail hereinafter. Data for lookup tables, generated a priori, is stored in memory 46 at the second node 40 with the master set-up control software 49 and/or at the management controller 60 with the set-up control software 68 in memory 64. As explained further hereinafter, the lookup table data maps target Raman gain and target Raman gain tilt to a ratio of the total power to be used for each of the plurality of Raman pump lasers $L_1$, $L_2$, $L_3$ and $L_4$.

The goal of the Raman set-up procedure presented herein is to determine the power level settings $P^{set}_1$, $P^{set}_2$, $P^{set}_3$ and $P^{set}_4$ for the Raman pump lasers $L_1$, $L_2$, $L_3$ and $L_4$, respectively, in the multi-wavelength Raman pump 41 of the second node 40. Receive power measurements are made at the second node 40 under certain conditions in order to derive appropriate power level settings for the Raman pump lasers $L_1$, $L_2$, $L_3$ and $L_4$ to achieve a desired or target Raman gain and desired or target Raman gain tilt in the optical fiber span between the first node 30 and the second node 40.

Figure 2:
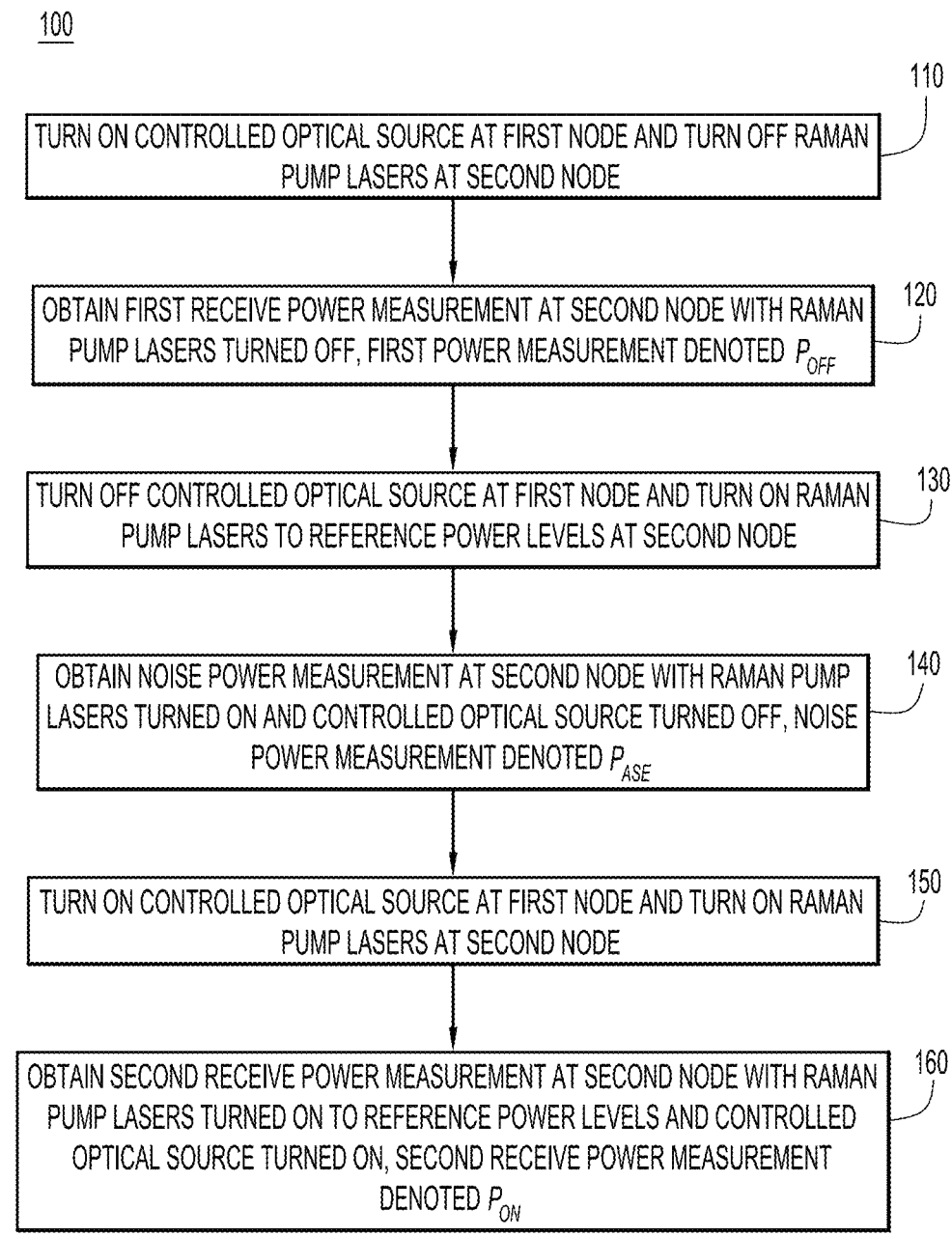
FIG. 2 is a flow chart depicting measurement operations performed in accordance with the Raman amplification set-up techniques presented herein.

Reference is now made to FIG. 2, with continued reference to FIG. 1. FIG. 2 shows a flow chart depicting operations of a procedure 100 to obtain receive power measurements at the second node 40. The procedure 100 involves coordination between the operational state (on or off) of the controlled optical source 32 at the first node 30 and the operational state (on or off) of the Raman pump lasers $L_1$, $L_2$, $L_3$ and $L_4$ at the second node 40. Commands may be sent to the first node 30, either by the second node 40 or by the management controller 60, to coordinate the activation and de-activation of the controlled optical source 32 with the activation and de-activation of the Raman pump lasers $L_1$, $L_2$, $L_3$ and $L_4$ at the second node 40 in order to obtain a first receive power measurement, a second receive power measurement and a noise power measurement, as described herein.

At 110, the controlled optical source 32 at the first node 30 is turned on and the Raman pump lasers $L_1$, $L_2$, $L_3$ and $L_4$ at the second node 40 are turned off. The controlled optical source 32 may already be turned on. At 120, a first receive power measurement is obtained at the second node (by way of the PD 43) with the controlled optical source 32 at the first node 30 turned on and the Raman pump lasers $L_1$, $L_2$, $L_3$ and $L_4$ at the second node 40 turned off. This first receive power measurement is denoted $P_{OFF}$.

At 130, the controlled optical source 32 at the first node 30 is turned off and the Raman pump lasers $L_1$, $L_2$, $L_3$ and $L_4$ at the second node 40 are turned on to reference power levels $P^R_1$, $P^R_2$, $P^R_3$ and $P^R_4$, respectively. Again, the controlled optical source 32 may already be turned off. At 140, noise power measurement at the second node 40 is obtained (by the PD 43) with Raman pump lasers $L_1$, $L_2$, $L_3$ and $L_4$ turned on and the controlled optical source 32 turned off. The noise power measurement is denoted $P_{ASE}$.

At 150, the controlled optical source 32 at the first node 30 is turned on (or it may already be turned on) and the Raman pump lasers $L_1$, $L_2$, $L_3$ and $L_4$ at the second node 40 are turned on to reference power levels $P^R_1$, $P^R_2$, $P^R_3$ and $P^R_4$, respectively. A second receive power measurement is obtained at 160 at the second node 40 (by the PD 43) with the controlled optical source 32 at the first node 30 turned on and the Raman pump lasers $L_1$, $L_2$, $L_3$ and $L_4$ at the second node 40 turned on to reference power levels $P^R_1$, $P^R_2$, $P^R_3$ and $P^R_4$, respectively. This second receive power measurement is denoted $P_{ON}$.

The operations 110/120, 130/140 and 150/160 may be performed in any sequence, and the sequence shown in FIG. 2 is not meant to be limiting. It is only necessary that the first receive power measurement, second receive power measurement and noise power measurement be obtained under the on/off states of the controlled optical source 32 and Raman pump lasers $L_1$, $L_2$, $L_3$ and $L_4$ described above. That is, a first receive power measurement ($P_{ON}$) is obtained at the second node with a controlled optical source at the first node turned on and with a plurality of Raman pump lasers at different wavelengths at the second node turned off. A second receive power measurement ($P_{OFF}$) is obtained at the second node with the controlled optical source at the first node turned on and the plurality of Raman pump lasers turned on to respective reference power levels to inject optical Raman pump power at a corresponding plurality of wavelengths into the optical fiber span. Further still, a noise measurement ($P_{ASE}$) is obtained at the second node with the controlled optical source at the first node turned off and the plurality of Raman pump lasers turned on to respective reference power levels. The power level of the controlled power source 32 can be the same in operations 120 and 150, or different; in the latter case the power level difference needs to be considered during Raman reference gain evaluation.

Figure 3:
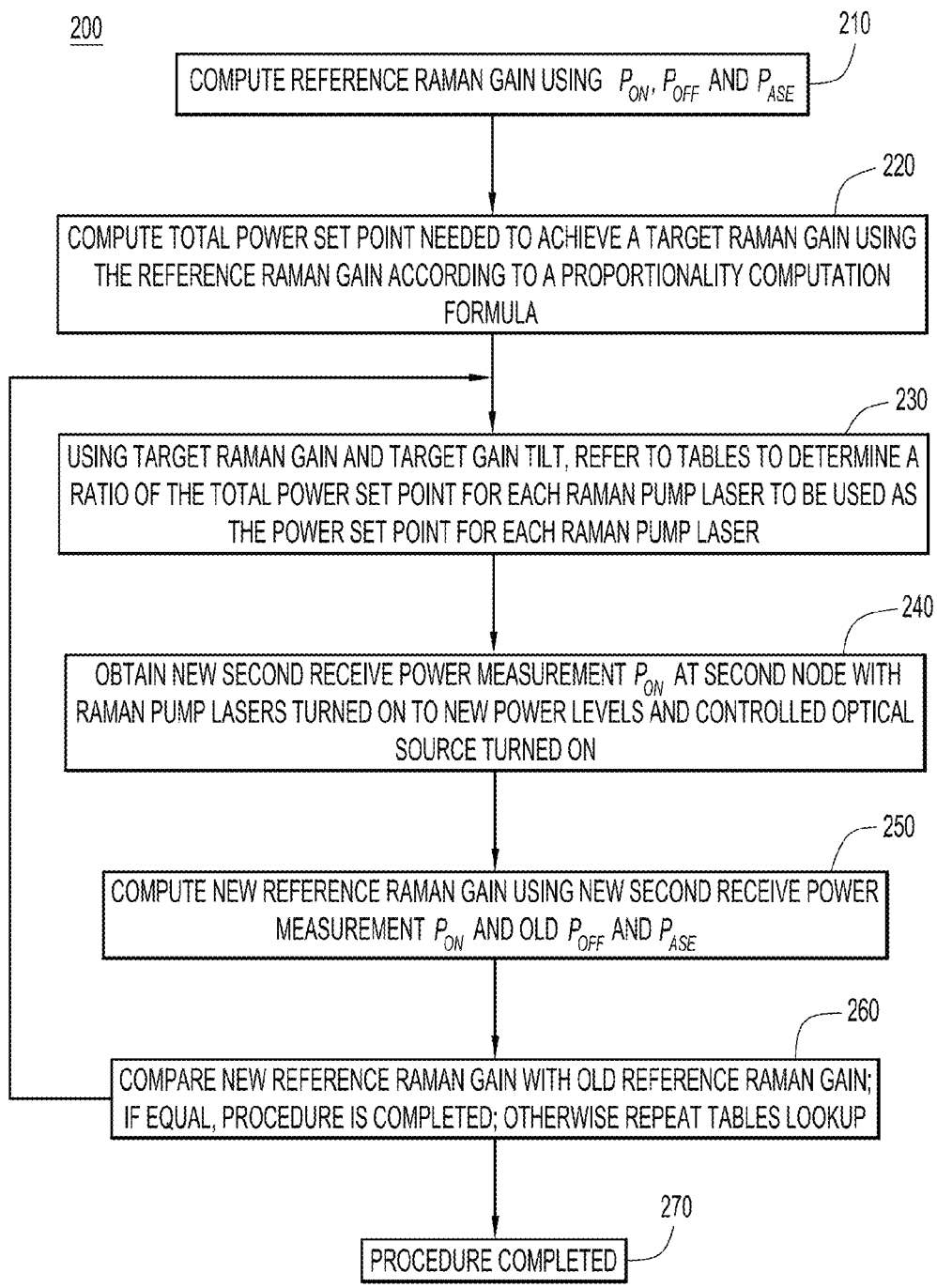
FIG. 3 is a flow chart illustrating the computations performed from the measurements made in the operations of FIG. 2.

Reference is now made to FIG. 3. FIG. 3 illustrates a flow chart of a procedure 200 for performing computations and operations based on the first receive power measurement $P_{OFF}$, the second receive power measurement $P_{ON}$ and the noise power measurement $P_{ASE}$. At 210, a reference Raman gain $G_{ref}$ is computed based on $P_{ON}$, $P_{OFF}$ and $P_{ASE}$ according to the formula:

$$G_{ref} = (P_{ON} - P_{ASE})_{mW}/(P_{OFF})_{mW}$$

The Gain in mW is converted to dB by the computation $G_{dB} = 10 \times \log_{10}(G_{mW})$. Thus, the reference Raman gain is computed based on a difference between the second power measurement and the noise power measurement, the difference divided by the first power measurement.

At 220, the total power set point (the sum of power from all of the pump lasers $L_1$, $L_2$, $L_3$ and $L_4$) needed to achieve a target Raman gain $G_{tgt}$ is computed based on the reference Raman gain, according to the formula $$P_{tot}^{TGT} = \frac{G_{tgt|dB}}{G_{ref|dB}} \sum P_i^R,$$

where $G_{ref}$ is computed at 210 as described above, $G_{tgt}$ is the target Raman gain that is desired and set by the network operator/administrator, and the summation is over the reference powers of the individual Raman pump lasers applied at 150 in the procedure of FIG. 2, i.e., summation of $P_1^R$, $P_2^R$, $P_3^R$ and $P_4^R$.

The quantity in front of the summation is a gain ratio of the target Raman gain $G_{tgt}$ in dB to the reference Raman gain $G_{ref}$ in dB. In other words, the total power set point is computed by computing a gain ratio of the target Raman gain to the reference Raman gain, and multiplying gain ratio by the sum of the respective reference power levels of the Raman pump lasers by the gain ratio.

Next, at 230, using the target Raman gain $G_{tgt}$ and target gain tilt $T_{tgt}$, lookup tables are referred to in order to determine a ratio ρi of the total power set point $P^{TGT}_{tot}$ to be used as the power set point $P^{set}_i$ for the corresponding Raman pump laser $L_i$. The power setting $P^{set}_i$ is then computed by multiplying the ratio ρi by the total power set point computed at 220, i.e., $P^{set}_i = \rho i (G_{tgt}, T_{tgt}) \times P^{TGT}_{tot}$. Thus, at 230, the power of each of the plurality of Raman pump lasers is set according to its respective ratio ρi of the total power set point $P^{TGT}_{tot}$.

Figure 4A:
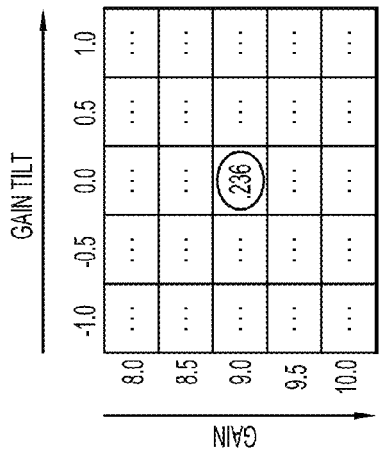
FIGS. 4A-4D are diagrams graphically depicting the use of stored lookup tables to determine the individual power ratios of the respective Raman pump lasers in accordance with the Raman amplification set-up techniques presented herein.
Figure 4B:
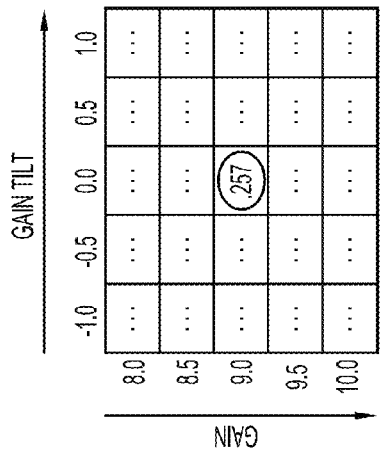
Figure 4C:
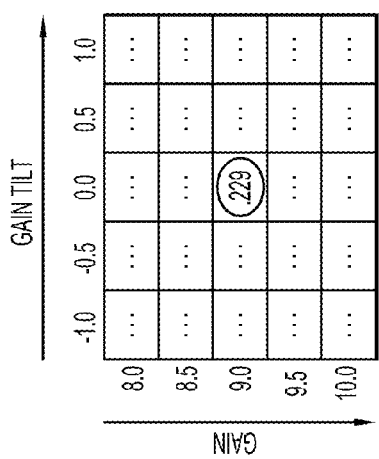
Figure 4D:
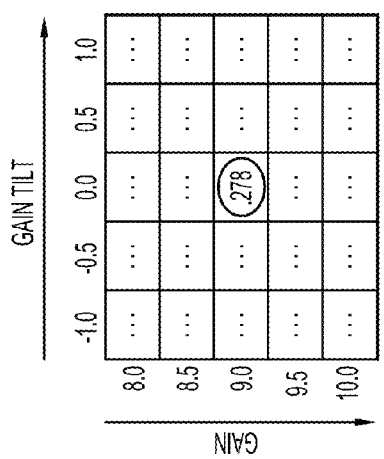

Reference is now made to FIGS. 4A-4D to further explain operation 230, and for an example in which there are four Raman pump lasers. FIG. 4A shows a table mapping target Raman gain $G_{tgt}$ and a target gain tilt $T_{tgt}$ to corresponding values for a ratio $\rho_1$ of the total power set point for a first Raman pump laser $L_1$. FIG. 4B shows a table mapping target Raman gain $G_{tgt}$ and a target gain tilt $T_{tgt}$ to corresponding values for a ratio $\rho_2$ of the total power set point for a second Raman pump laser $L_2$. FIG. 4C shows a table mapping target Raman gain $G_{tgt}$ and a target Raman gain tilt $T_{tgt}$ to corresponding values for a ratio $\rho_3$ of the total power set point for a third Raman pump laser $L_3$, and FIG. 4D shows a table mapping target Raman gain $G_{tgt}$ and a target gain tilt $T_{tgt}$ to corresponding values for a ratio $\rho_4$ of the total power set point for a fourth Raman pump laser $L_4$.

Each lookup table contains a ratio value for different pairs/couples of Raman gain $G_{tgt}$ and Raman gain tilt $T_{tgt}$ for a corresponding one of the Raman pump lasers. The Raman gain values are arranged along the rows of the table and the Raman gain tilt values are arranged along the columns of the table. For simplicity, only the values for a particular example (described below) are included in the tables of FIGS. 4A-4D, but it should be understood that there are entries in the tables for each combination of gain and tilt values. There may be ratios provided in the table for a wider range of gain values and tilt values than that shown in FIGS. 4A-4D. The sum of the ratios obtained from all four tables for a given (gain,tilt) couple/pair is 1. In general, the sum of the ratios obtained from N tables (for N Raman pump lasers) is 1.

The target Raman gain $G_{tgt}$ and target Raman gain tilt $T_{tgt}$ are determined a priori by the network administrator. In particular, the target Raman gain tilt $T_{tgt}$ is 0 (zero) or flat (gain is the same across all wavelengths), a positive value (gain is greater for higher wavelengths) or a negative value (gain is greater for lower wavelengths). Normally, but not always, the target Raman gain tilt is 0, meaning the gain is the same across all wavelengths.

Consider the example in which the target Raman gain is 9.0 and the target Raman gain tilt is 0.0 as determined/set by a network administrator/operator. Each of the tables shown in FIGS. 4A-4D is referred to using the (gain,tilt) couple/pair (9.0,0.0) to retrieve the ratio for the corresponding Raman pump laser, as shown by the circles in each table. The ratio for Raman pump laser 1 for the (gain,tilt) couple/pair (9.0,0.0) is 0.229, the ratio for Raman pump laser 2 is 0.278, the ratio for Raman pump laser 3 is 0.236 and the ratio for Raman pump laser 4 is 0.257. (Note that these four ratios will add up to 1.) The power setting for Raman pump laser 1, $P^{set}_1$ is 0.229× the total power set point, $P^{TGT}_{tot}$, the power setting for Raman pump laser 2, $P^{set}_2$ is 0.278× the total power set point, $P^{TGT}_{tot}$, the power setting for Raman pump laser 3, $P^{set}_3$ is 0.236× the total power set point, $P^{TGT}_{tot}$, and the power setting for Raman pump laser 4, $P^{set}_4$ is 0.257× the total power set point, $P^{TGT}_{tot}$.

Reference is now made back to FIG. 3. In one use of this procedure, the reference Raman gain is re-measured after the Raman pump laser ratios are applied. If the reference Raman gain is different, new ratios are retrieved from the tables based on the newly measured Raman gain and the procedure is repeated until two measured reference Raman gains are the same (within a certain margin). Specifically, at 240, after setting the power for each of the plurality of Raman pump lasers, operations 150 and 160 (of FIG. 2) are repeated to obtain a new second receive power measurement (with the Raman pump lasers turned on to the powers set at 230 and the controlled optical source turned on). Then, at 250, a new reference Raman gain is computed based on the new second receive power measurement and the old or previously obtained first receive power measurement and noise measurement. At 260, the new reference Raman gain is compared with the reference Raman gain computed prior to setting the power of the plurality of Raman pump lasers. If the new reference Raman gain is different from the reference Raman gain computed prior to setting the power of the plurality of Raman pump lasers, new ratios are obtained based on the new reference Raman gain and the powers of the plurality of Raman pump lasers are set based on the new ratios. Further iterations of repeating the second receive power measurement at 240, computing the new reference Raman gain at 250, and comparing at 260 the new reference Raman gain with the previous reference Raman gain (computed at the previous iteration) are made until the new reference Raman gain is equal, within a predetermined margin, to the reference Raman gain at the previous iteration. Thus, when the new reference Raman gain is equal to the previous reference Raman gain, the procedure ends as indicated at 270.

The computations described above in connection with FIGS. 3 and 4A-4D may be performed at the second node 40 or at the management controller 60 (as shown in FIG. 1), through the use of the processor resources resident at those entities.

The following summarizes the flow charts of FIGS. 2 and 3. For an optical fiber span coupled between a first node and a second node, a first receive power measurement is obtained at the second node with a controlled optical source at the first node turned on and with a plurality of Raman pump lasers at different wavelengths at the second node turned off. A second receive power measurement is obtained at the second node with the controlled optical source at the first node turned on and the plurality of Raman pump lasers turned on to respective reference power levels to inject optical Raman pump power at a corresponding plurality of wavelengths into the optical fiber span. A reference Raman gain is computed based on the first receive power measurement and the second receive power measurement. A total power from the plurality of Raman pump lasers needed to achieve a target Raman gain in the optical fiber span is computed based on the reference Raman gain, the target Raman gain and a sum of the respective reference power levels used by the plurality of Raman pump lasers to obtain the second receive power measurement. Based on the target Raman gain and a target Raman gain tilt, respective ratios of the total power are obtained, each ratio to be used for a corresponding one of the plurality of Raman pump lasers. As explained above in connection with FIGS. 4A-4B, the respective ratios are obtained by retrieving ratios from stored data (e.g., lookup tables) that map target Raman gain and target Raman gain tilt for each of the corresponding Raman pump lasers. The power of each of the plurality of Raman pump lasers is set according to its respective ratio of the total power.

The computation of the reference Raman gain may be further based on a noise measurement made at the second node with the controlled optical source at the first node turned off and the plurality of Raman pump lasers turned on to respective reference power levels. Taking the noise measurement into account, the computation of the reference Raman gain is based further on a difference between the first receive power measurement and the noise measurement, divided by the second receive power measurement.

Raman amplification operations are tied to the particular type of optical fiber used in the spans of a network. This is largely out of the control of the optical network equipment manufacturer. The Raman amplification set-up techniques presented herein do not require any knowledge of the type of optical fiber or characteristics of the optical fiber, such as attenuation or path panel losses. Only the Raman amplifier (which typically includes a photodiode) is primarily involved in the set-up procedure, and only the hardware components around the amplified fiber span are involved in the process. The controlled optical source at the other end of the span from the Raman amplifier can be any type of optical source as long as it operates within the amplified wavelength range. Moreover, the Amplified Spontaneous Emission (ASE) noise associated with an EDFA can serve as the controlled optical source, and this is particularly useful since an EDFA is usually present as a booster in optical systems.

Background and Theory for these Techniques

The rationale behind the set-up procedure presented herein is that Raman gain and Raman tilt (for a minimum ripple) are dependent only on the pump ratio set $$\left(\frac{P_1}{P_{tot}}, \frac{P_2}{P_{tot}}, \frac{P_3}{P_{tot}}, \frac{P_4}{P_{tot}}\right)$$

regardless of the fiber type, with an adequate approximation. This assumption has been drawn from a set of simulations that are detailed as follows.

1. Raman gain of a channel comb spanning the entire C-band and with a multi-wavelength pump was simulated with different pump set points and on different fiber types.

2. From these simulations, the gain, tilt, ripple and noise figure were evaluated to obtain a correspondence $(p_1, p_2, p_3, p_4) \rightarrow (g, t, r, n)$.

3. The quantities $\rho i = P_i/P_{tot}$, where $P_{tot} = \Sigma P_i$ are introduced.

4. The relationship $(g,t) \rightarrow (p_1, p_2, p_3, p_4)$ has been found to be independent of the fiber type, subject to a reasonable/adequate approximation.

Simulations were run on an optical fiber span with an optical source that outputs 48 channels, 100 GHz spaced, at 1 dBm channel power, at one end of the fiber, and a four wavelength Raman pump at the other end of the fiber. The span used is approximately 140 km long. The Raman pumps wavelengths are 1423, 1434, 1455, and 1470 nm. The pump power was varied from 0 to 350 mW for each wavelength individually, and four different quantities were collected as a function of the individual pump power levels:

1. The average on-off Raman gain $G(P_1, P_2, P_3, P_4)$ as the average gain (in dB) of the channels. The gain is defined as the difference (in dB) between the received channel power with pumps turned on and the received channel power with Raman pumps turned off.

2. The Raman gain tilt $T(P_1, P_2, P_3, P_4)$, defined as the slope of the linear fit of the channel on-off gain, multiplied by the spectrum bandwidth.

3. The maximum noise figure $N(P_1, P_2, P_3, P_4)$ among the channels.

4. The channel gain ripple $R(P_1, P_2, P_3, P_4)$, defined as the difference (in dB) between the channel gain and the linear trend (maximum absolute value is taken).

The above simulation set-up was repeated for a large set of fiber types, obtaining different gain, tilt, noise figure and ripple for the same $(P_1, P_2, P_3, P_4)$ combination.

The different levels of the four quantities listed above are caused by, from the optical source side, the different effective area of the different fibers, and from the Raman pump side, by the different wavelength dependent losses in the pump region. With a rough simplification, the effective area of the fiber affects mainly the average gain, while the wavelength dependent losses affect mainly the gain tilt.

The next step is to invert the relationship: $(P_1, P_2, P_3, P_4) \rightarrow (G,T)$ accounting for the constraints of minimizing ripple R. In other words, for each (G,T) pair/couple, a set of power levels $(P_1, P_2, P_3, P_4)_{G,T}$ is selected. Among the values of the set, the value providing minimum ripple is selected. Interpolation of simulation results is used to achieve finer details. That is, interpolation of $G(P_1, P_2, P_3, P_4)$, $T(P_1, P_2, P_3, P_4)$, $N(P_1, P_2, P_3, P_4)$, $R(P_1, P_2, P_3, P_4)$, is done with 8.75 mW granularity vs. the 50 mW step of the simulations.

Thus, $P_i = \rho_{i,Rmin}(g,t)$ i=1, ... 4, where Rmin denotes a minimum ripple. The relative pump power $\rho_i = P_i/P_{tot}$, where $P_{tot} = \Sigma P_i$.

This analysis was performed on the several types of fibers: Allwave® fiber, Enhanced-Large Effective Area Fiber (eLEAF), Single-mode fiber (SMF), TrueWave-reach (TWreach), and TrueWave-RS (TWRS). The results are then averaged obtaining:

$$\bar{\rho}_i = \text{mean}\{\rho_i^{Allwave}, \rho_i^{eLEAF}, \rho_i^{SMF}, \rho_i^{TWreach}, \rho_i^{TWRS}\}$$

$$\varepsilon_i = \frac{\max\left\{\begin{array}{l}\max\{\rho_i^{Allwave}, \rho_i^{eLEAF}, \rho_i^{SMF}, \rho_i^{TWreach}, \rho_i^{TWRS}\} - \\ \bar{\rho}_i, \bar{\rho}_i - \min\{\rho_i^{Allwave}, \rho_i^{eLEAF}, \rho_i^{SMF}, \rho_i^{TWreach}, \rho_i^{TWRS}\}\end{array}\right\}}{\bar{\rho}_i}$$

By evaluating contour plots of these results, it was found that $\varepsilon_i < 20\%$. A simplifying assumption is made that the on-off average gain is a function only of the total power (for limited tilt range). Therefore, if one can measure the on-off Raman gain, the pump ratio to achieve a target gain tilt can be evaluated using a lookup table built upon average power ratio as a function of target gain and tilt, and minimum gain ripple.

The following are real-world examples of four tables of ratios, each for a corresponding one of four Raman lasers, the data for the tables generated as described above. Again, as explained above, values of target Raman gain arranged in the rows and values of Raman gain tilt are arranged in the columns.

TABLE 1

$\rho_1$ for Raman Pump Laser 1.

| | −3.60 | −3.00 | −2.40 | −1.80 | −1.20 | −0.60 | 0.00 | 0.60 | 1.20 | 1.80 | 2.40 | 3.00 | 3.6 |
|---|---|---|---|---|---|---|---|---|---|---|---|---|---|
| 8.0 | 0.354 | 0.309 | 0.306 | 0.304 | 0.267 | 0.257 | 0.205 | 0.192 | 0.186 | 0.179 | 0.156 | 0.103 | 0.049 |
| 9.0 | 0.364 | 0.348 | 0.330 | 0.310 | 0.268 | 0.252 | 0.229 | 0.221 | 0.171 | 0.167 | 0.164 | 0.140 | 0.105 |
| 10.0 | 0.349 | 0.345 | 0.322 | 0.307 | 0.298 | 0.259 | 0.236 | 0.222 | 0.209 | 0.189 | 0.159 | 0.146 | 0.134 |
| 11.0 | 0.365 | 0.356 | 0.317 | 0.301 | 0.291 | 0.281 | 0.256 | 0.234 | 0.221 | 0.190 | 0.167 | 0.174 | 0.141 |
| 12.0 | 0.379 | 0.355 | 0.336 | 0.316 | 0.307 | 0.290 | 0.259 | 0.248 | 0.216 | 0.210 | 0.195 | 0.184 | 0.157 |
| 13.0 | 0.379 | 0.366 | 0.354 | 0.335 | 0.300 | 0.309 | 0.294 | 0.251 | 0.248 | 0.222 | 0.204 | 0.187 | 0.177 |
| 14.0 | 0.374 | 0.342 | 0.349 | 0.343 | 0.306 | 0.306 | 0.296 | 0.277 | 0.262 | 0.224 | 0.217 | 0.201 | 0.177 |
| 15.0 | 0.367 | 0.348 | 0.338 | 0.336 | 0.340 | 0.309 | 0.311 | 0.277 | 0.257 | 0.258 | 0.240 | 0.222 | 0.206 |
| 16.0 | 0.369 | 0.361 | 0.351 | 0.331 | 0.332 | 0.312 | 0.294 | 0.278 | 0.254 | 0.247 | 0.245 | 0.222 | 0.209 |
| 17.0 | 0.379 | 0.374 | 0.366 | 0.341 | 0.331 | 0.317 | 0.305 | 0.295 | 0.277 | 0.257 | 0.245 | 0.237 | 0.219 |
| 18.0 | 0.374 | 0.377 | 0.370 | 0.344 | 0.339 | 0.327 | 0.314 | 0.301 | 0.288 | 0.280 | 0.254 | 0.238 | 0.234 |
| 19.0 | 0.375 | 0.374 | 0.372 | 0.344 | 0.350 | 0.341 | 0.317 | 0.310 | 0.290 | 0.291 | 0.264 | 0.268 | 0.240 |
| 20.0 | 0.392 | 0.377 | 0.362 | 0.370 | 0.350 | 0.333 | 0.322 | 0.322 | 0.290 | 0.284 | 0.285 | 0.262 | 0.251 |
| 21.0 | 0.375 | 0.378 | 0.378 | 0.372 | 0.356 | 0.339 | 0.327 | 0.320 | 0.323 | 0.302 | 0.288 | 0.270 | 0.257 |
| 22.0 | 0.384 | 0.387 | 0.388 | 0.376 | 0.365 | 0.356 | 0.345 | 0.342 | 0.318 | 0.303 | 0.296 | 0.298 | 0.271 |

TABLE 2

$\rho_2$ for Raman Pump Laser 2.

| | −3.60 | −3.00 | −2.40 | −1.80 | −1.20 | −0.60 | 0.00 | 0.60 | 1.20 | 1.80 | 2.40 | 3.00 | 3.6 |
|---|---|---|---|---|---|---|---|---|---|---|---|---|---|
| 8.0 | 0.351 | 0.357 | 0.324 | 0.303 | 0.292 | 0.259 | 0.292 | 0.271 | 0.233 | 0.203 | 0.194 | 0.179 | 0.180 |
| 9.0 | 0.316 | 0.299 | 0.310 | 0.299 | 0.305 | 0.284 | 0.278 | 0.246 | 0.259 | 0.227 | 0.204 | 0.190 | 0.166 |
| 10.0 | 0.324 | 0.299 | 0.291 | 0.300 | 0.280 | 0.288 | 0.280 | 0.255 | 0.245 | 0.232 | 0.224 | 0.200 | 0.185 |
| 11.0 | 0.319 | 0.297 | 0.310 | 0.297 | 0.290 | 0.281 | 0.276 | 0.260 | 0.243 | 0.250 | 0.242 | 0.208 | 0.205 |
| 12.0 | 0.296 | 0.296 | 0.297 | 0.292 | 0.287 | 0.281 | 0.284 | 0.268 | 0.271 | 0.249 | 0.245 | 0.224 | 0.220 |
| 13.0 | 0.296 | 0.294 | 0.283 | 0.287 | 0.291 | 0.269 | 0.262 | 0.277 | 0.260 | 0.260 | 0.248 | 0.236 | 0.226 |
| 14.0 | 0.308 | 0.318 | 0.292 | 0.281 | 0.297 | 0.283 | 0.269 | 0.267 | 0.262 | 0.270 | 0.251 | 0.247 | 0.244 |
| 15.0 | 0.314 | 0.315 | 0.307 | 0.296 | 0.276 | 0.286 | 0.267 | 0.280 | 0.277 | 0.253 | 0.247 | 0.246 | 0.230 |
| 16.0 | 0.309 | 0.312 | 0.305 | 0.302 | 0.291 | 0.294 | 0.290 | 0.284 | 0.288 | 0.275 | 0.257 | 0.257 | 0.251 |
| 17.0 | 0.315 | 0.298 | 0.301 | 0.306 | 0.299 | 0.296 | 0.293 | 0.284 | 0.282 | 0.284 | 0.276 | 0.261 | 0.257 |
| 18.0 | 0.322 | 0.303 | 0.296 | 0.307 | 0.297 | 0.295 | 0.292 | 0.287 | 0.290 | 0.280 | 0.284 | 0.282 | 0.259 |
| 19.0 | 0.327 | 0.316 | 0.309 | 0.314 | 0.291 | 0.295 | 0.301 | 0.291 | 0.292 | 0.284 | 0.285 | 0.270 | 0.273 |
| 20.0 | 0.312 | 0.316 | 0.316 | 0.304 | 0.308 | 0.308 | 0.301 | 0.290 | 0.301 | 0.291 | 0.283 | 0.286 | 0.277 |
| 21.0 | 0.331 | 0.319 | 0.309 | 0.305 | 0.306 | 0.309 | 0.305 | 0.298 | 0.290 | 0.290 | 0.288 | 0.287 | 0.282 |
| 22.0 | 0.334 | 0.319 | 0.309 | 0.310 | 0.307 | 0.307 | 0.299 | 0.296 | 0.298 | 0.299 | 0.295 | 0.280 | 0.290 |

TABLE 3

$\rho_3$ for Raman Pump Laser 3.

| | −3.60 | −3.00 | −2.40 | −1.80 | −1.20 | −0.60 | 0.00 | 0.60 | 1.20 | 1.80 | 2.40 | 3.00 | 3.6 |
|---|---|---|---|---|---|---|---|---|---|---|---|---|---|
| 8.0 | 0.228 | 0.255 | 0.281 | 0.250 | 0.285 | 0.317 | 0.212 | 0.176 | 0.193 | 0.184 | 0.111 | 0.138 | 0.078 |
| 9.0 | 0.301 | 0.333 | 0.243 | 0.248 | 0.241 | 0.263 | 0.236 | 0.256 | 0.213 | 0.218 | 0.168 | 0.129 | 0.154 |
| 10.0 | 0.294 | 0.319 | 0.336 | 0.255 | 0.263 | 0.248 | 0.244 | 0.261 | 0.221 | 0.210 | 0.199 | 0.187 | 0.136 |
| 11.0 | 0.244 | 0.285 | 0.281 | 0.293 | 0.267 | 0.240 | 0.237 | 0.263 | 0.254 | 0.214 | 0.185 | 0.177 | 0.153 |
| 12.0 | 0.278 | 0.287 | 0.274 | 0.278 | 0.252 | 0.240 | 0.234 | 0.235 | 0.224 | 0.222 | 0.180 | 0.184 | 0.163 |

TABLE 3-continued $\rho_3$ for Raman Pump Laser 3.

| | −3.60 | −3.00 | −2.40 | −1.80 | −1.20 | −0.60 | 0.00 | 0.60 | 1.20 | 1.80 | 2.40 | 3.00 | 3.6 |
|---|---|---|---|---|---|---|---|---|---|---|---|---|---|
| 13.0 | 0.276 | 0.268 | 0.275 | 0.256 | 0.273 | 0.256 | 0.248 | 0.235 | 0.224 | 0.209 | 0.208 | 0.201 | 0.169 |
| 14.0 | 0.257 | 0.260 | 0.272 | 0.269 | 0.261 | 0.242 | 0.251 | 0.245 | 0.232 | 0.222 | 0.221 | 0.198 | 0.185 |
| 15.0 | 0.255 | 0.259 | 0.267 | 0.256 | 0.253 | 0.248 | 0.247 | 0.238 | 0.232 | 0.242 | 0.234 | 0.212 | 0.219 |
| 16.0 | 0.270 | 0.246 | 0.251 | 0.262 | 0.249 | 0.240 | 0.249 | 0.249 | 0.239 | 0.237 | 0.237 | 0.229 | 0.210 |
| 17.0 | 0.239 | 0.262 | 0.240 | 0.244 | 0.246 | 0.246 | 0.239 | 0.239 | 0.236 | 0.228 | 0.223 | 0.226 | 0.219 |
| 18.0 | 0.238 | 0.252 | 0.253 | 0.249 | 0.251 | 0.247 | 0.244 | 0.245 | 0.220 | 0.220 | 0.218 | 0.207 | 0.228 |
| 19.0 | 0.232 | 0.235 | 0.229 | 0.245 | 0.260 | 0.235 | 0.234 | 0.240 | 0.238 | 0.219 | 0.226 | 0.216 | 0.216 |
| 20.0 | 0.239 | 0.236 | 0.240 | 0.227 | 0.230 | 0.237 | 0.242 | 0.241 | 0.242 | 0.243 | 0.223 | 0.220 | 0.223 |
| 21.0 | 0.239 | 0.237 | 0.237 | 0.234 | 0.240 | 0.237 | 0.242 | 0.243 | 0.227 | 0.235 | 0.231 | 0.233 | 0.234 |
| 22.0 | 0.222 | 0.231 | 0.230 | 0.229 | 0.230 | 0.225 | 0.239 | 0.227 | 0.238 | 0.234 | 0.225 | 0.227 | 0.220 |

TABLE 4

$\rho_4$ or Raman Pump Laser 4.

| | −3.60 | −3.00 | −2.40 | −1.80 | −1.20 | −0.60 | 0.00 | 0.60 | 1.20 | 1.80 | 2.40 | 3.00 | 3.6 |
|---|---|---|---|---|---|---|---|---|---|---|---|---|---|
| 8.0 | 0.067 | 0.079 | 0.088 | 0.143 | 0.156 | 0.167 | 0.291 | 0.361 | 0.388 | 0.435 | 0.539 | 0.580 | 0.693 |
| 9.0 | 0.018 | 0.020 | 0.117 | 0.144 | 0.185 | 0.201 | 0.257 | 0.276 | 0.357 | 0.388 | 0.464 | 0.541 | 0.575 |
| 10.0 | 0.033 | 0.037 | 0.051 | 0.138 | 0.160 | 0.205 | 0.241 | 0.261 | 0.325 | 0.369 | 0.418 | 0.468 | 0.545 |
| 11.0 | 0.071 | 0.063 | 0.093 | 0.110 | 0.153 | 0.198 | 0.231 | 0.243 | 0.282 | 0.347 | 0.406 | 0.441 | 0.501 |
| 12.0 | 0.047 | 0.062 | 0.094 | 0.114 | 0.155 | 0.189 | 0.223 | 0.249 | 0.290 | 0.319 | 0.380 | 0.408 | 0.461 |
| 13.0 | 0.048 | 0.073 | 0.087 | 0.121 | 0.136 | 0.166 | 0.196 | 0.236 | 0.268 | 0.309 | 0.340 | 0.376 | 0.428 |
| 14.0 | 0.062 | 0.080 | 0.088 | 0.107 | 0.137 | 0.168 | 0.184 | 0.212 | 0.244 | 0.285 | 0.312 | 0.354 | 0.395 |
| 15.0 | 0.064 | 0.077 | 0.089 | 0.112 | 0.130 | 0.157 | 0.175 | 0.206 | 0.234 | 0.247 | 0.279 | 0.320 | 0.345 |
| 16.0 | 0.052 | 0.081 | 0.093 | 0.104 | 0.128 | 0.154 | 0.168 | 0.189 | 0.218 | 0.240 | 0.261 | 0.292 | 0.331 |
| 17.0 | 0.067 | 0.066 | 0.094 | 0.109 | 0.124 | 0.141 | 0.164 | 0.182 | 0.205 | 0.231 | 0.256 | 0.276 | 0.305 |
| 18.0 | 0.066 | 0.068 | 0.081 | 0.099 | 0.113 | 0.130 | 0.150 | 0.167 | 0.202 | 0.219 | 0.243 | 0.272 | 0.279 |
| 19.0 | 0.066 | 0.075 | 0.091 | 0.096 | 0.099 | 0.129 | 0.148 | 0.160 | 0.179 | 0.206 | 0.225 | 0.245 | 0.271 |
| 20.0 | 0.056 | 0.071 | 0.081 | 0.099 | 0.112 | 0.123 | 0.134 | 0.147 | 0.167 | 0.183 | 0.209 | 0.231 | 0.249 |
| 21.0 | 0.056 | 0.066 | 0.076 | 0.088 | 0.099 | 0.115 | 0.126 | 0.139 | 0.160 | 0.173 | 0.192 | 0.209 | 0.226 |
| 22.0 | 0.060 | 0.064 | 0.073 | 0.085 | 0.097 | 0.112 | 0.117 | 0.135 | 0.145 | 0.164 | 0.184 | 0.196 | 0.220 |

As explained above, the Raman amplification set-up techniques presented herein are automatic. The Raman amplifier block can automatically adjust the power of its lasers, based on the results of the computations described above. There is no need for a network administrator to remember to run and tune Raman pumps on every span. The procedure can be running in the background. Moreover, there is no need to characterize the fibers with test suites, etc. In fact, it is not necessary to even know the type or characteristics of the fiber on which these techniques are used. Each fiber has different gain characteristics, but these techniques do not require knowledge of those gain characteristics in order to set the power levels of the Raman pump lasers.

To achieve a wider wavelength/bandwidth of optical communications in the fiber, more Raman pump lasers are needed to achieve the desired Raman amplification in the fiber. These Raman pump set-up techniques can be extended to more than 4 (or less) than 4 Raman pump lasers. There is no need for additional hardware over what is already installed at each node on opposite ends of the spans in order to handle normal optical signal traffic.

To summarize, a method is provided comprising: for an optical fiber span coupled between a first node and a second node, obtaining a first receive power measurement at the second node with a controlled optical source at the first node turned on and with a plurality of Raman pump lasers at different wavelengths at the second node turned off; obtaining a second receive power measurement at the second node with the controlled optical source at the first node turned on and the plurality of Raman pump lasers turned on to respective reference power levels to inject optical Raman pump power at a corresponding plurality of wavelengths into the optical fiber span; computing a reference Raman gain based on the first receive power measurement and the second receive power measurement; computing a total power from the plurality of Raman pump lasers needed to achieve a target Raman gain in the optical fiber span based on the reference Raman gain and a sum of the respective reference power levels used by the plurality of Raman pump lasers used to obtain the second receive power measurement; obtaining, based on the target Raman gain and a target Raman gain tilt, respective ratios of the total power, each ratio to be used for a corresponding one of the plurality of Raman pump lasers; and setting the power of each of the plurality of Raman pump lasers according to its respective ratio of the total power.

Likewise, an apparatus is provided comprising: a Raman amplifier comprising a plurality of Raman pump lasers configured to inject optical Raman pump power at a corresponding plurality of wavelengths into a second end of an optical fiber to achieve Raman amplification of an optical signal output by a controlled optical source at a first end of the optical fiber; a photodiode configured to detect power at the second end of the optical fiber; a controller coupled to the photodiode and to the Raman amplifier, wherein the controller is configured to: obtain a first receive power measurement with the controlled optical source turned on and with the plurality of Raman pump lasers turned off; obtain a second receive power measurement with the controlled optical source at the first node turned on and the plurality of Raman pump lasers turned on to respective reference power levels; compute a reference Raman gain based on the first receive power measurement and the second receive power measurement; compute a total power from the plurality of Raman pump lasers needed to achieve a target Raman gain in the optical fiber span based on the reference Raman gain and a sum of the respective reference power levels used by the plurality of Raman pump lasers to obtain the second receive power measurement; obtain, based on the target Raman gain and a target Raman gain tilt, respective ratios of the total power, each ratio to be used for a corresponding one of the plurality of Raman pump lasers; and set the power of each of the plurality of Raman pump lasers according to its respective ratio of the total power.

Further, one or more tangible computer readable storage media are provided encoded with software comprising computer executable instructions and when the instructions are executed by a processor, the processor is operable to: for an optical fiber span coupled between a first node and a second node, obtain a first receive power measurement at the second node with a controlled optical source at the first node turned on and with a plurality of Raman pump lasers at different wavelengths at the second node turned off; obtain a second receive power measurement at the second node with the controlled optical source at the first node turned on and the plurality of Raman pump lasers turned on to respective reference power levels to inject optical Raman pump power at a corresponding plurality of wavelengths into the optical fiber span; compute a reference Raman gain based on the first receive power measurement and the second receive power measurement; compute a total power from the plurality of Raman pump lasers needed to achieve a target Raman gain in the optical fiber span based on the reference Raman gain and a sum of the respective reference power levels used by the plurality of Raman pump lasers used to obtain the second receive power measurement; obtain, based on the target Raman gain and a target Raman gain tilt, respective ratios of the total power, each ratio to be used for a corresponding one of the plurality of Raman pump lasers; and set the power of each of the plurality of Raman pump lasers according to its respective ratio of the total power.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
   for an optical fiber span coupled between a first node and a second node, obtaining a first receive power measurement at the second node with a controlled optical source at the first node turned on and with a plurality of Raman pump lasers at different wavelengths at the second node turned off;
   obtaining a second receive power measurement at the second node with the controlled optical source at the first node turned on and the plurality of Raman pump lasers turned on to respective reference power levels to inject optical Raman pump power at a corresponding plurality of wavelengths into the optical fiber span;
   obtaining a noise measurement at the second node with the controlled optical source at the first node turned off and the plurality of Raman pump lasers turned on to the respective power levels;
   computing a reference Raman gain based on the first receive power measurement, the noise measurement, and the second receive power measurement;
   computing a total power from the plurality of Raman pump lasers needed to achieve a target Raman gain in the optical fiber span based on the reference Raman gain and a sum of the respective reference power levels used by the plurality of Raman pump lasers used to obtain the second receive power measurement;
   obtaining respective ratios of the total power from lookup tables that map target Raman gain and target Raman gain tilt to the respective ratios for each of the Raman pump lasers, each ratio to be used for a corresponding one of the plurality of Raman pump lasers; and
   setting the power of each of the plurality of Raman pump lasers according to its respective ratio of the total power.

2. The method of claim 1, wherein computing the reference Raman gain is based on the noise measurement according to a difference between the first receive power measurement and the noise measurement, the difference divided by the second receive power measurement.

3. The method of claim 1, wherein computing the total power comprises computing a gain ratio of the target Raman gain to the reference Raman gain, and multiplying the sum of the respective reference power levels by the gain ratio.

4. The method of claim 1, wherein obtaining the first receive power measurement and the second receive power measurement are performed with a single wavelength controlled optical source at the first node.

5. The method of claim 1, wherein obtaining the first receive power measurement and the second receive power measurement are performed with a dense wavelength division multiplexed controlled optical source that outputs a channel comb of a plurality of optical wavelengths.

6. The method of claim 1, wherein obtaining the first receive power measurement and the second receive power measurement are performed with a wideband optical source that outputs a wideband optical signal spanning a wavelength range where Raman amplification is desired.

7. The method of claim 1, wherein computing the total power and obtaining the respective ratios are performed at the second node or at a controller apparatus that is in communication with the second node.

8. The method of claim 1, further comprising:
   after setting the power for each of the plurality of Raman pump lasers:
   obtaining a new second receive power measurement; and
   computing a new reference Raman gain using the new second receive power measurement;
   comparing the new reference Raman gain with the reference Raman gain computed prior to setting the power of the plurality of Raman pump lasers;
   if the new reference Raman gain is different from the reference Raman gain computed prior to setting the power of the plurality of Raman pump lasers, obtaining new ratios based on the new reference Raman gain and setting the power of the plurality of Raman pump lasers based on the new ratios.

9. The method of claim 8, wherein obtaining the new second receive power measurement, computing the new reference Raman gain, and comparing the new reference Raman gain with the reference Raman gain are repeated until the new reference Raman gain is equal, within a predetermined margin, to the reference Raman gain at the previous iteration.

10. An apparatus comprising:
    a Raman amplifier comprising a plurality of Raman pump lasers configured to inject optical Raman pump power at a corresponding plurality of wavelengths into a second end of an optical fiber to achieve Raman amplification of an optical signal output by a controlled optical source at a first end of the optical fiber;
    a photodiode configured to detect power at the second end of the optical fiber;

a controller coupled to the photodiode and to the Raman amplifier, wherein the controller is configured to:

obtain a first receive power measurement with the controlled optical source turned on and with the plurality of Raman pump lasers turned off;

obtain a second receive power measurement with the controlled optical source at the first node turned on and the plurality of Raman pump lasers turned on to respective reference power levels;

obtain a noise measurement with the controlled optical source turned off and the plurality of Raman pump lasers turned on to the respective power levels;

compute a reference Raman gain based on the first receive power measurement, the noise measurement, and the second receive power measurement;

compute a total power from the plurality of Raman pump lasers needed to achieve a target Raman gain in the optical fiber span based on the reference Raman gain and a sum of the respective reference power levels used by the plurality of Raman pump lasers to obtain the second receive power measurement;

obtain respective ratios of the total power from stored lookup tables that map target Raman gain and target Raman gain tilt to the respective ratios for each of the corresponding Raman pump lasers, each ratio to be used for a corresponding one of the plurality of Raman pump lasers; and set the power of each of the plurality of Raman pump lasers according to its respective ratio of the total power.

11. The apparatus of claim 10, wherein the controller is configured to compute the reference Raman gain based on the noise measurement according to a difference between the first receive power measurement and the noise measurement, the difference divided by the second receive power measurement.

12. The apparatus of claim 10, wherein the controller is configured to compute the total power by computing a gain ratio of the target Raman gain to the reference Raman gain, and multiplying the sum of the respective reference power levels by the gain ratio.

13. The apparatus of claim 10, wherein the controller is further configured to, after setting the power for each of the plurality of Raman pump lasers:

obtain a new second receive power measurement;

compute a new reference Raman gain using the second receive power measurement;

compare the new reference Raman gain with the reference Raman gain computed prior to setting the power of the plurality of Raman pump lasers;

if the new reference Raman gain is different from the reference Raman gain computed prior to setting the power of the plurality of Raman pump lasers, obtain new ratios based on the new reference Raman gain and set the power of the plurality of Raman pump lasers based on the new ratios;

repeat obtaining the new second receive power measurement, computing a new reference Raman gain, and comparing the new reference Raman gain with the Raman gain at the previous iteration until the new reference Raman gain is equal, within a predetermined margin, to the reference Raman gain at the previous iteration.

14. One or more non-transitory tangible computer readable storage media encoded with software comprising computer executable instructions and when the instructions are executed by a processor, the processor is operable to:

for an optical fiber span coupled between a first node and a second node, obtain a first receive power measurement at the second node with a controlled optical source at the first node turned on and with a plurality of Raman pump lasers at different wavelengths at the second node turned off;

obtain a second receive power measurement at the second node with the controlled optical source at the first node turned on and the plurality of Raman pump lasers turned on to respective reference power levels to inject optical Raman pump power at a corresponding plurality of wavelengths into the optical fiber span;

obtain a noise measurement with the controlled optical source turned off and the plurality of Raman pump lasers turned on to the respective power levels;

compute a reference Raman gain based on the first receive power measurement, the noise measurement, and the second receive power measurement;

compute a total power from the plurality of Raman pump lasers needed to achieve a target Raman gain in the optical fiber span based on the reference Raman gain and a sum of the respective reference power levels used by the plurality of Raman pump lasers used to obtain the second receive power measurement;

obtain respective ratios of the total power from lookup tables that map target Raman gain and target Raman gain tilt for each of the Raman pump lasers, each ratio to be used for a corresponding one of the plurality of Raman pump lasers; and set the power of each of the plurality of Raman pump lasers according to its respective ratio of the total power.

15. The computer readable storage media of claim 14, further comprising instructions operable to compute the reference Raman gain based on the noise measurement according to a difference between the first receive power measurement and the noise measurement, the difference divided by the second receive power measurement.

16. The computer readable storage media of claim 14, wherein the instructions operable to compute the total power comprise instructions operable to compute a gain ratio of the target Raman gain to the reference Raman gain, and multiplying the sum of the respective reference power levels by the gain ratio.

17. The computer readable storage media of claim 14, further comprising instructions operable to, after setting the power for each of the plurality of Raman pump lasers:

obtain a new second receive power measurement;

compute a new reference Raman gain using the second receive power measurement;

compare the new reference Raman gain with the reference Raman gain computed prior to setting the power of the plurality of Raman pump lasers;

if the new reference Raman gain is different from the reference Raman gain computed prior to setting the power of the plurality of Raman pump lasers, obtain new ratios based on the new reference Raman gain and set the power of the plurality of Raman pump lasers based on the new ratios;

repeat obtaining the new second receive power measurement, computing a new reference Raman gain, and comparing the new reference Raman gain with the Raman gain at the previous iteration until the new reference Raman gain is equal, within a predetermined margin, to the reference Raman gain at the previous iteration.

18. The method of claim 1, wherein the plurality of Raman pump lasers comprises more than two Raman pump lasers at more than two different wavelengths.

19. The apparatus of claim 10, wherein the Raman amplifier comprises more than two Raman pump lasers at more than two different wavelengths.

20. The computer readable storage media of claim 14, wherein the plurality of Raman pump lasers comprises more than two Raman pump lasers at more than two different wavelengths.

* * * * *